United States Patent Office 2,789,923
Patented Apr. 23, 1957

2,789,923

ALKYL FERRATE COATING PROCESS AND COATED SOLID SURFACE

Charles O. Bostwick, Wilmington, Del., assignor to E. I. du Pont de Nemours and Company, Wilmington, Del., a corporation of Delaware No Drawing. Application September 10, 1953, Serial No. 379,472

5 Claims. (Cl. 117—124)

This invention pertains to the preparation of ferric esters and of coating materials made therefrom containing iron. More particularly, it concerns the preparation of protective films comprising polymeric iron compounds.

Many coating and protective materials have certain weaknesses with respect to ease of application and durability. In many instances application of a smooth glossy film free of brush marks is difficult. Another sometimes costly factor in painting is the long drying time. It is therefore apparent that certain improvements related to adhesion, toughness, abrasion and scratch resistance are highly desired.

It is, therefore, an object of this invention to produce novel ferric esters and coatings therefrom which have improved adhesion, gloss, mechanical and thermal durability, and more rapid setting and drying periods.

These and other objects are attained by this invention which broadly comprises preparing a hydrolysable organic ferrate, incorporating this preparation in a substantially anhydrous fluid coating composition, applying said fluid composition to a surface of a solid material, allowing solvent to evaporate and causing hydrolysis and polymerization of said hydrolysable organic ferrate while on said surface by contact with water vapor.

The organic ferrates useful in this invention may be prepared by the interaction of an iron salt such as $FeCl_3$, $FeBr_3$, etc. and an alcohol in the presence of ammonia. The resulting ammonium chloride is filtered off and the organic iron compound concentrated by evaporation. This concentrate, or a solution of it in a suitable non-aqueous solvent, may be used alone whereby a poly oxide coating which on complete hydrolysis and polymerization approaches the composition represented by $(Fe_2O_3)_n$ is formed. The degree of hydrolysis and polymerization may vary with the humidity and temperature used in forming the film. Temperatures used to set this film depend on the thermal stability of the supporting substance. On ceramics heat of the order of 1000° C. may be used. Heating is not always essential however. In preparing poly oxide coatings by hydrolysis of the iron esters in the absence of other film-forming material, better adhesion is obtained in the case of thin poly oxide films preferably of about one micron or less. These may be obtained by using ester solutions containing up to about 2% of triisopropyl ferrate or the molecular equivalent of other iron esters.

The organic ferrates or solutions thereof may be mixed with other known non-aqueous coating compositions such as the natural drying oil paints and varnishes, the alkyd resins, air drying, and baking enamels, and the organic ester types of coating materials in general. When incorporated in such film-forming compositions, the resulting coating is usually more adherent, durable, abrasion resistant, and hardens more rapidly than the coating without the iron compound. The amount of the iron compound used may vary considerably and preferably is used in amounts containing iron ranging from 0.1% to 2% Fe by weight of the composition.

The organic ferrates used are the products of the reaction of an alcohol and, for example, $FeCl_3$ when ammonia or other base such as an amine is used to react with the HCl formed. The reactions which are believed to occur are $$(ROH)_3 + FeCl_3 = Fe(OR)_3 + 3HCl$$
$$3HCl + 3NH_3 = 3NH_4Cl$$

The organic radical may be any hydrocarbon or halogenated hydrocarbon group. Preferably R is an alkyl group containing not more than eight carbon atoms being generally the most useful, especially the ethyl, isopropyl and n-butyl groups.

The following examples serve to illustrate the preparation of the iron ferrates and their use in making improved coatings.

Example I 162 gms. of anhydrous $FeCl_3$ was placed in a flask and 222 gms. of n-butyl alcohol saturated with ammonia slowly added. The mixture darkened and became warm. 300 ml. additional butanol was added and $NH_3$ gas bubbled through the solution. Further heat was evolved. When ammonia appeared at the outlet tube and no further heat was evolved the solution was filtered, out of contact with moisture, to remove ammonium chloride. Most of the excess butanol was removed by distillation at 30–50 mm. and 50° C. The residual clear deep red solution was diluted with turpentine. A glass plate dipped in this solution, air dried and baked at 300° C. acquired a permanent red coating.

Example II 162 gms. $FeCl_3$ (one mol.) was dissolved in 200 ml. of hexane and cooled to about —15° C. 269 gms. of n-butanol were added slowly while cooling to the —15° C. range and bubbling in $NH_3$. 600 ml. more hexane were added to keep mixture fluid. After fours hours the reaction appeared to be complete and the slurry of ammonium chloride was filtered in the absence of moisture. The crystals were washed with dry cyclohexane to remove the red color. The filtrate and washings were placed under dry nitrogen and vacuum distilled to a final pot temperature of 50° C. and 2 mm. pressure. 62 grams of a rather viscous deep red liquid were recovered. This liquid analysed less than 0.1% Cl and 16.26% Fe. The theoretical value for $(BuO)_3Fe$ is 20.25% Fe. The product of this experiment therefore appeared to be a mixture of 80.3% $(BuO)_3Fe$ and 19.7% butanol. A molecular weight determination in benzene corrected on the basis of the above analysis gave a value of 558 which is theoretically correct for $(Fe(OBu)_3)_2$. Efforts to vacuum distill this product resulted in decomposition without appreciable distillation.

Example III

A fluid preparation was made by mixing 10.5 grams of the product of Example II, 10 grams of a soy alkyd drying oil (G. E. 2466) and 3 grams of xylol. One gram of flake aluminum was dispersed in this mixture. The resulting paint produced an adherent very pleasing gold colored coating.

Example IV

The butyl ferrate of Example II, G. E. 2466, and high flash naphtha were mixed in the weight proportions: 10.5, 10.5, and 79. Films placed on glass and exposed to air dried to a clear, hard, adherent film. On ignition in a muffle furnace a permanent, highly reflective red polyoxide film was left.

Example V

A coating composition was prepared by mixing 4 parts by weight of the (BuO)₃Fe (80% soln.), 4 parts of G. E. 2466 and 30 parts of high flash naphtha. Films of this preparation placed on steel panels and air dried, remained good for three days at 600° C.

Example VI 10 parts by weight of a non-drying type coconut oil-phthalic anhydride resin solution, (1) 8 parts of xylol and 10 parts of the 80% ferrate of Example II were mixed. Initial gelling occurred but on stirring and adding a little more xylol a clear solution was obtained. This mixture was brushed onto a wood panel. On air drying, an adherent, glossy, hard reddish film was obtained. (1) Duraplex ND-77B.

The action of the iron ester in Example VI is especially noteworthy since the coconut oil-phathalic anhydride preparation does not dry of its own accord.

Example VII

Isopropyl ferrate was prepared by dispersing 100 grams of anhydrous ferric chloride in one liter of hexane in a flask protected from atmospheric moisture and fitted with agitator and gas inlet, outlet, and dropping funnel. The ferric chloride suspension was saturated with $NH_3$ and 160 gms. of isopropanol (dry) added during agitation. After refluxing 3 hours the mixture was cooled and filtered with exclusion of moisture. The filtrate was distilled under vacuum in a stream of dry nitrogen to remove solvent and excess isopropanol. The viscous liquid residue was found to contain only a trace of chlorine and contained 90% of the original iron. This tri isopropyl ferrate could be used in the formation of coatings in substantially the same manner that the butyl ester was used in the previous examples.

Example VIII

By substituting 200 gms. of tertiary butanol for the isopropanol in Example VII, tritertiary butyl ferrate was obtained in 85% yield based on the $FeCl_3$ used.

I claim as my invention:
1. A process for coating a surface to be protected which comprises applying a solution of an ammonia neutralized ferruginous reaction product of ferric chloride and an aliphatic alcohol having not more than eight carbon atoms in an anhydrous volatile organic solvent to said surface as a film, evaporating said solvent, and polymerizing said reaction product on said surface.
2. A solid surface protectively coated with an adherent polyoxide film formed on said surface by polymerizing thereon an alkyl ferrate coating film.
3. A solid surface protectively coated with an adherent polyoxide film formed on said surface by polymerizing thereon a coated film of tri-n-butyl ferrate.
4. A process for protectively coating the surface of a solid comprising applying an anhydrous volatile organic solvent solution of an alkyl ferrate, the alkyl groups of which contain not more than 8 carbon atoms, to a surface of said solid in the form of a film, evaporating said solvent therefrom and polymerizing said alkyl ferrate and setting the same as a film on said surface by heating at a temperature below the thermal instability of the solid being coated.
5. A process for coating glass which comprises applying a solution of butyl ferrate, a soy alkyd drying oil and an anhydrous volatile organic solvent to the surface of said glass in the form of a film, evaporating the solvent therefrom and firing the coated glass at a temperature below the thermal instability of said glass to form a polyoxide protective film thereon.

References Cited in the file of this patent

FOREIGN PATENTS 304,585    Great Britain _____ June 20, 1929

OTHER REFERENCES

Thiessen et al.: Ziet Anorg. u. Allegem. Chem., 180 (1929) pp. 65-74.

Chemical Abstracts, 31—6548 (1937).